（12） United States Patent
Yamanashi

(10) Patent No.: US 6,828,051 B2
(45) Date of Patent: Dec. 7, 2004

(54) FUEL-CELL SYSTEM FOR MOVING BODY AND CONTROL METHOD THEREOF

(75) Inventor: Fuminori Yamanashi, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 339 days.

(21) Appl. No.: 10/048,058

(22) PCT Filed: May 1, 2001

(86) PCT No.: PCT/JP01/03767

§ 371 (c)(1),
(2), (4) Date: Jan. 25, 2002

(87) PCT Pub. No.: WO01/92050

PCT Pub. Date: Dec. 6, 2001

(65) Prior Publication Data

US 2003/0012990 A1 Jan. 16, 2003

(30) Foreign Application Priority Data

May 30, 2000 (JP) ........................................ 2000-159595

(51) Int. Cl.[7] .............................................. H01M 8/12
(52) U.S. Cl. .............................. 429/24; 429/12; 429/22
(58) Field of Search ................................ 429/12, 22, 24

(56) References Cited

U.S. PATENT DOCUMENTS 5,877,600 A    3/1999  Sonntag ....................... 318/139
6,638,652 B1 * 10/2003  Motozono et al. ............. 429/19
6,676,907 B1 *  1/2004  Benz et al. .................. 422/193

FOREIGN PATENT DOCUMENTS

| EP | 0 773 131 | 5/1997 |
|---|---|---|
| EP | 0 798 798 | 10/1997 |
| EP | 0 993 060 | 4/2000 |
| JP | 9-315801 | 12/1997 |

OTHER PUBLICATIONS

Moser et al., "PEM Fuel Cells: Technology and Application in Electrically Driven Vehicles," EVS—13, 13th International Electric Vehicle Symposium, Osaka (Oct. 13–16, 1996), vol. 1, Symp. 13, pp. 680–685.

Nadal et al., "Development of a Hybrid Fuel Cell/Battery Powered Electric Vehicle," International Journal of Hydrogen Energy, vol. 21, No. 6 (Jun. 1, 1996), pp. 497–505.

* cited by examiner

*Primary Examiner*—Dah-Wei Yuan
(74) *Attorney, Agent, or Firm*—Foley & Lardner LLP

(57) ABSTRACT

A fuel-cell system for a moving body comprising a reforming reactor (120) for reforming fuel to generate gas including hydrogen, a carbon monoxide removing reactor (130) for removing carbon monoxide included in a reformed gas generated in the reforming reactor, a fuel-cell (200) for generating electric power using the reformed gas and gas including oxygen which passed through the carbon monoxide removing reactor, and a compressor (400) for supplying the gas including oxygen to the reforming reactor, the carbon monoxide removing reactor and the fuel-cell, wherein when it is judged that the moving body was running and the accelerator was closed, fuel, water and gas including oxygen, or fuel and the gas including oxygen is supplied to the reforming reactor such that minimum hydrogen required for maintaining a temperature of the reforming reactor is generated, and minimum gas including oxygen required for maintaining a temperature of the carbon monoxide removing reactor is supplied to the carbon monoxide removing reactor.

13 Claims, 16 Drawing Sheets

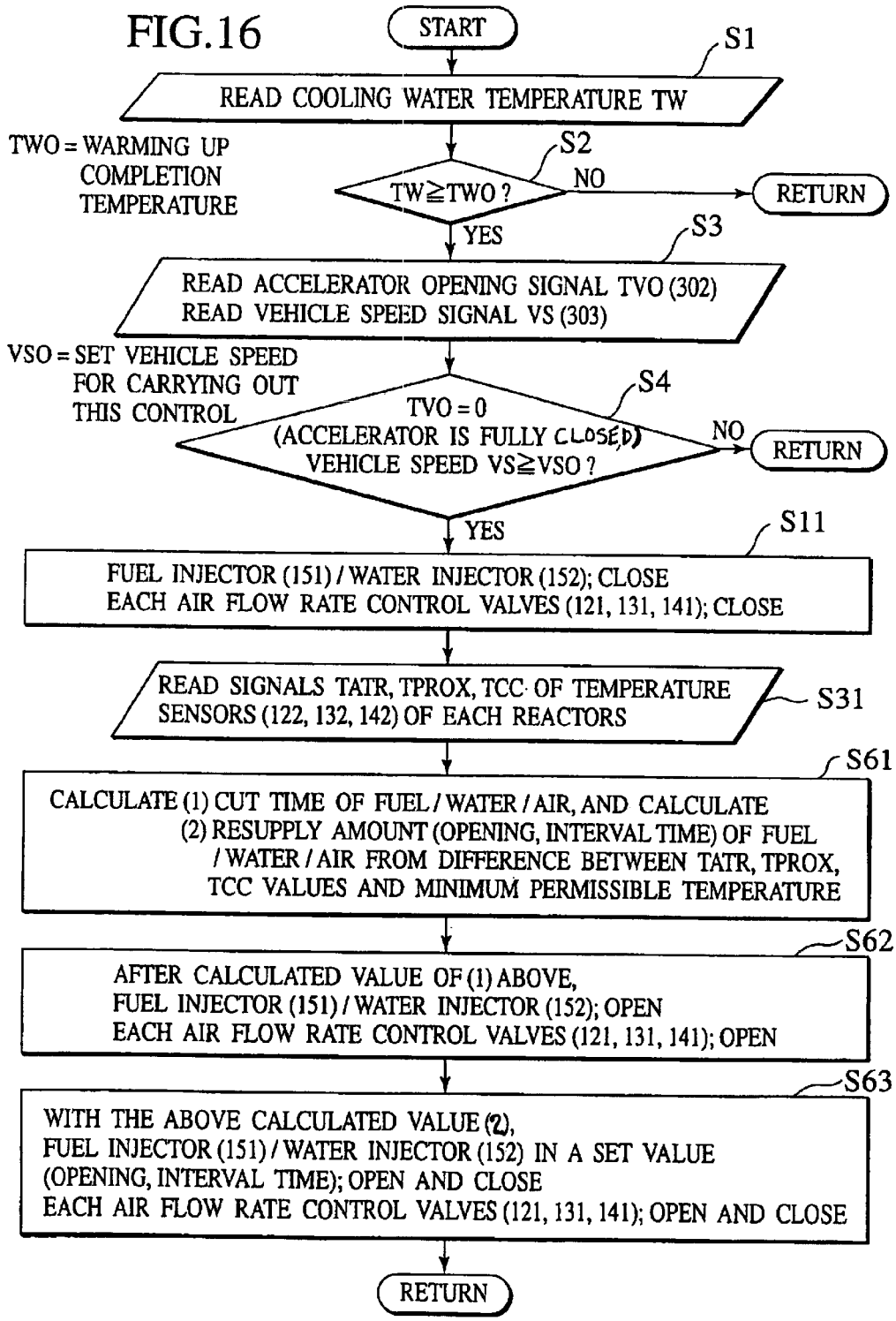

FUEL-CELL SYSTEM FOR MOVING BODY AND CONTROL METHOD THEREOF

BACKGROUND OF THE INVENTION

The present invention relates to a fuel-cell system preferably mounted to various moving body such as an automobile and a control method of the fuel-cell system. More particularly, the invention relates to a fuel-cell system for a moving body that can idle the moving body which is effective in terms of re-acceleration and fuel economy, and relates to a control method of the fuel-cell system.

The fuel-cell system of this kind is an apparatus for directly converting energy having the fuel into electric energy. The fuel-cell system supplies hydrogen-rich gas toward a cathode (fuel pole) of a pair of poles provided such as to sandwich an electrolyte film, and supplies gas including oxygen toward the other pole, i.e., an anode (oxidizer pole). The fuel-cell system taken out electric energy from the poles utilizing the following electrical reaction generated on surfaces of the pair of poles at the side of the electrolyte film:

Anode reaction: $H_2 \rightarrow 2H^+ + 2e^-$

Cathode reaction: $2H^+ + 2e^- + (1/2) O_2 \rightarrow H_2O$

As a apparatus for generating the hydrogen-rich gas which will become superconductive fuel, a reforming reactor reforming methanol into fuel gas including large amount of hydrogen is used. As an apparatus for generating oxidizer including oxygen, a compressor for taking in air to produce compressed air is used. The compressed air from the compressor is cooled by an aftercooler or the like and then, the air is supplied to the anode of the fuel-cell, on one hand, the methanol gas is sent from a fuel tank to a reforming reactor, and the reformed hydrogen-rich gas is supplied to the cathode of the fuel-cell.

As compared with an electric automobile using a secondary battery, the fuel-cell system is advantageous in terms of travelable distance, maintenance condition of infrastructure of fuel and the like. Therefore, it is studied to employ the fuel-cell system as an electric source for driving vehicles.

As the reforming reactor, in addition to a vapor reforming type reforming reactor for vapor-reforming hydrocarbon such as methanol, there is proposed a so-called auto-thermal type reforming reactor for facilitating the vapor reforming reaction of the hydrocarbon which is an endothermic reaction utilizing heat discharged by oxidation of the hydrocarbon (e.g., see Japanese Patent Application Laid-open No.H9-315801). In the auto-thermal type reforming reactor of this kind, air (oxygen), water vapor and hydrocarbon such as methanol are mixed and flowed into a reactor charged with a copper-based catalyst, a noble metal or a VIII group metal catalyst, thereby causing the following reactions:

Partial oxidation reaction: $CH_3OH + 1/2H_2O_2 \rightarrow 2H_2 + CO_2 + 189.5$ kJ/mol Vapor reaction: $CH_3OH + O \rightarrow 3H_2 + CO_2 + -49.5$ kJ/mol Then, a heat amount necessary for the vapor reforming reaction (endothermic reaction) using the heat generated by the partial oxidation reaction (exothermic reaction), and a small reforming reactor requiring no outside heater such as a burner can be provided.

Further, the reformed gas generated by the reforming reaction includes impurities such as small amount of non-reformed fuel gas or carbon monoxide in addition to hydrogen and carbon dioxide. If gas including such impurities such as non-reformed fuel gas and carbon monoxide is supplied to the fuel as it is, the platinum which is used regularly as electrode catalyst of fuel-cell is poisoned and there are problems that catalytic activity is lost and battery performance is lowered.

Thereupon, the reformed gas generated by the reforming reactor is allowed to pass, together with air, into a carbon monoxide removing apparatus having oxidation catalyst, thereby facilitate the oxidation reaction of carbon monoxide ($CO + 1/2O_2 \rightarrow CO_2$) so that the concentration of the carbon monoxide is lowered. By providing such a carbon monoxide removing apparatus in the fuel-cell system, the cell performance is prevented from being lowered, and the hydrogen in the reformed gas is purified higher and thus, the electric power generating efficiency is enhanced.

SUMMARY OF THE INVENTION

In a fuel-cell system mounted to a moving body such as a vehicle, as a driving control method when an accelerator is closed during running, there is a method for stopping the actuation of the system by cutting the fuel supply or for driving the moving body at low load as an internal combustion engine such as a gasoline engine. As the method for driving the moving body at low load, like the idling is carried out in the internal combustion engine, it seems to be possible to throttle fuel, water and air to be supplied to the reforming reactor, or to intermittently supply fuel, water and air.

However, in the fuel-cell system mounted in the moving body, if the accelerator is closed during running, since a regenerative function acts to charge the secondary battery, electric power generation by the fuel-cell stack under this condition is basically unnecessary. However, when the secondary battery is insufficiently charged, the electric power generation is effective in some cases.

When the electric power generation by the fuel-cell stack is unnecessary, since the reforming system does not need to supply the hydrogen gas to the stack, it is preferable, in terms of fuel economy, to cut the fuel supply like the internal combustion engine such as the gasoline engine to stop the system or drive the system at a low load.

However, if the fuel-cell system is stopped, temperature of catalysts of various reactors such as the reforming reactor, the carbon monoxide removing apparatus and the combustor is gradually lowered, and when the vehicle descends a long hill and then re-accelerates such as an expressway, the catalyst temperature of each reactor becomes excessively low, and even if reaction is required by re-acceleration or the like, there is an adverse possibility that the vehicle can not react sufficiently.

When the accelerator is closed, if the reforming system is driven at low-load driving state such as an idling state of the internal combustion engine, it is possible to always keep such a temperature of each reactor that the reactor can react. However, it is difficult and not efficiency to drive the reforming system at low-load driving state. Thus, fuel is excessively consumed, and fuel economy can not be prevented from being deteriorated.

It seems to be possible to intermittently supply fuel instead of flowing gas of low flow rate as low-load driving, but if the fuel is merely supplied intermittently, it is difficult to largely reduce the fuel consumption, and if the carbon monoxide removing reactor and hydrogen gas by the combustor are not utilized, the fuel economy can not be prevented from being deteriorated.

The present invention has been accomplished in view of these problems of the prior art, and it is an object of the invention to provide a fuel-cell system for a moving body and a control method of the system capable of idling the moving body in a most effective manner in terms of fuel economy and re-acceleration when an accelerator is closed.

To achieve the above object, the present invention provides a fuel-cell system for a moving body comprising: a reforming reactor for reforming fuel to generate gas including hydrogen, a carbon monoxide removing reactor for removing carbon monoxide included in a reformed gas generated in the reforming reactor, a fuel-cell for generating electric power using the reformed gas and gas including oxygen which passed through the carbon monoxide removing reactor, a compressor for supplying the gas including oxygen to the reforming reactor, the carbon monoxide removing reactor and the fuel-cell, a running state detecting section for detecting a running state of the moving body, an accelerator opening detecting section for detecting accelerator opening of the moving body, and a control section, wherein when the control section judged that the moving body was running and the accelerator was closed based on information of the running state detecting section and the accelerator opening detecting section, the control section supplies fuel, water and gas including oxygen, or fuel and the gas including oxygen such to the reforming reactor such that minimum hydrogen required for maintaining a temperature of the reforming reactor is generated, and supplies minimum gas including oxygen required for maintaining a temperature of the carbon monoxide removing reactor to the carbon monoxide removing reactor.

In other words, the present invention provides a fuel-cell system for a moving body comprising: a reforming reactor for reforming fuel to generate gas including hydrogen, a carbon monoxide removing reactor for removing carbon monoxide included in a reformed gas generated in said reforming reactor, a fuel-cell for generating electric power using the reformed gas and gas including oxygen which passed through said carbon monoxide removing reactor, a compressor for supplying the gas including oxygen to said reforming reactor, said carbon monoxide removing reactor and said fuel-cell, a running state detecting means for detecting a running state of said moving body, an accelerator opening detecting means for detecting accelerator opening of said moving body, and a control means, wherein when said control means judged that said moving body was running and said accelerator was closed based on information of said running state detecting means and said accelerator opening detecting means, said control means supplies fuel, water and gas including oxygen, or fuel and the gas including oxygen such to said reforming reactor such that minimum hydrogen required for maintaining a temperature of said reforming reactor is generated, and supplies minimum gas including oxygen required for maintaining a temperature of said carbon monoxide removing reactor to said carbon monoxide removing reactor.

Besides, a control method of a fuel-cell system for a moving body comprising a reforming reactor for reforming fuel to generate gas including hydrogen, a carbon monoxide removing reactor for removing carbon monoxide included in a reformed gas generated in said reforming reactor, a fuel-cell for generating electric power using the reformed gas and gas including oxygen which passed through said carbon monoxide removing reactor, and a compressor for supplying the gas including oxygen to said reforming reactor, said carbon monoxide removing reactor and said fuel-cell, wherein when it is judged that said moving body was running and said accelerator was closed, fuel, water and gas including oxygen, or fuel and the gas including oxygen such is supplied to said reforming reactor such that minimum hydrogen required for maintaining a temperature of said reforming reactor is generated, and minimum gas including oxygen required for maintaining a temperature of said carbon monoxide removing reactor is supplied to said carbon monoxide removing reactor.

According to the invention, hydrogen which must be generated by the reforming reactor for maintaining the temperature is only hydrogen for warming the reforming reactor itself for the generated heat and hydrogen for causing oxidization reaction of the generated hydrogen in the carbon monoxide removing reactor. Thus, the fuel consumption is minimized. Further, since the temperature of each of the reforming reactor and the carbon monoxide removing reactor is maintained, the response at the time of re-acceleration is enhanced.

BRIEF DESCRIPTION OF THE DRAWINGS

FIG. 16 is a flowchart showing operation of the eight embodiment of the invention.

DESCRIPTION OF THE PREFERRED EMBODIMENTS

Embodiments of the present invention will be explained based on the drawings below.

First Embodiment

Figure 1:
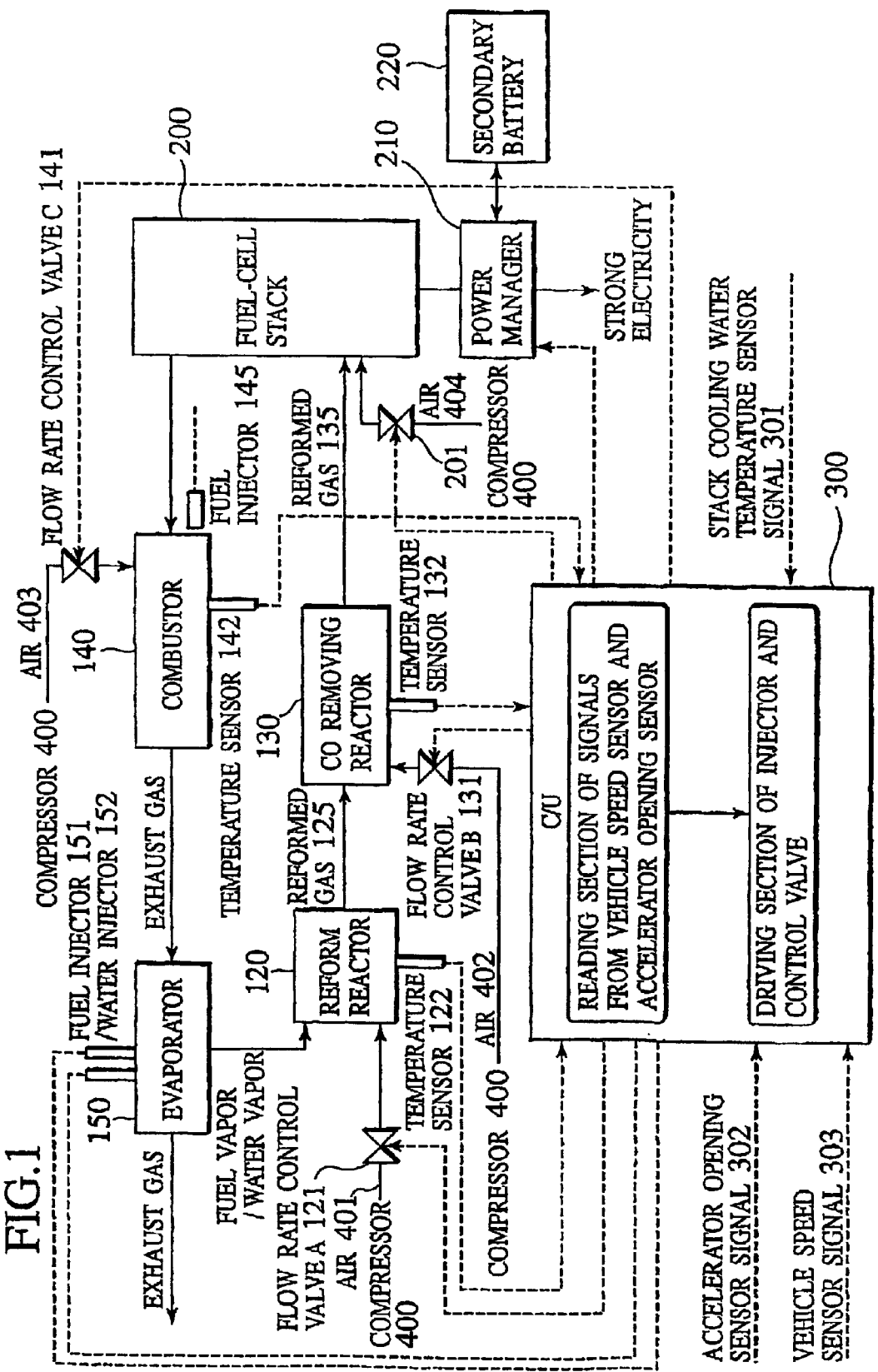
FIG. 1 is a block diagram showing a fuel-cell system of a first embodiment of the present invention.
Figure 2:
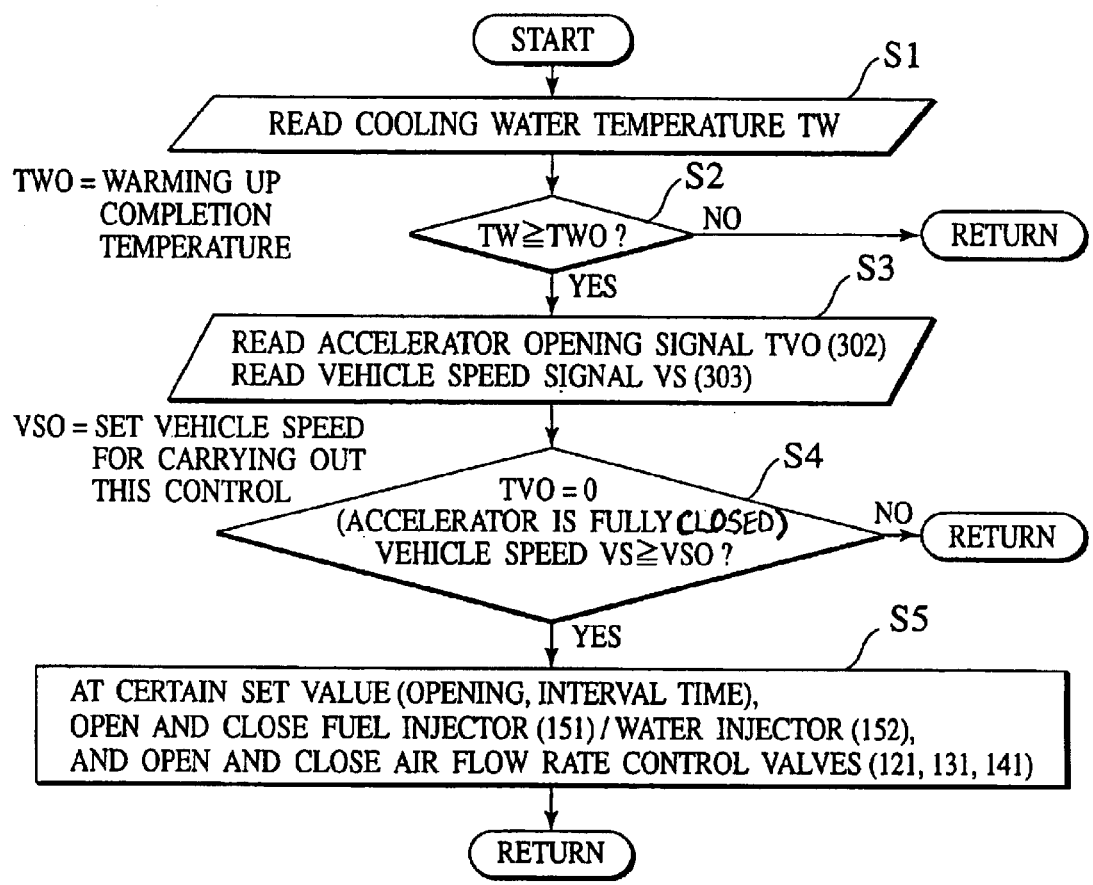
FIG. 2 is a flowchart showing operation of the first embodiment of the invention.

FIG. 1 is a block diagram showing a fuel-cell system of a first embodiment of the present invention, and FIG. 2 is a flowchart showing operation of the first embodiment.

A structure of the fuel-cell system of this embodiment will be explained first. The fuel-cell system 1 of the embodiment includes a reforming reactor 120 for reforming hydrocarbon such as methanol to generate hydrogen such as methanol to generate hydrogen-rich reformed gas, a fuel-cell stack 200 for generating electricity using hydrogen gas and oxygen gas as fuel gas, a carbon monoxide removing reactor 130 for removing carbon monoxide included in the reformed gas, a combustor 140 for burning excessive hydrogen gas from the fuel-cell stack 200 to obtain thermal energy, a reforming reactor 120, a compressor 400 for supplying air which is gas including oxygen (oxidizer) to the carbon monoxide removing reactor 130, the combustor 140 and the fuel-cell stack 200, and an evaporator 150 for vaporizing methanol and water utilizing the thermal energy of the exhaust gas supplied from the combustor 140.

The electric power obtained by the fuel-cell stack 200 is supplied to a motor and the like which are outside load through a power manager 210, and the electric power is also accumulated in a secondary battery 220 through the power manager 210.

The fuel-cell stack 200 is provided with a pair of poles sandwiching an electrolyte film, compressed air 404 from the compressor 400 is supplied toward a cathode of the fuel-cell stack, reformed gas 135 enriched with hydrogen which was generated by the reforming reactor 120 and passed through the carbon monoxide removing reactor 130 is supplied toward an anode, and the fuel-cell stack 200 assumes super electricity by the following electrical and chemical reaction. An amount of air supplied from the compressor 400 is adjusted by a flow rate control valve 201 in accordance with command from a control unit 300.

Anode reaction: $H_2 \rightarrow 2H^+ + 2e^-$

Cathode reaction: $2H^+ + 2e^- + (1/2)\ O_2 \rightarrow H_2O$

Hydrogen ion generated by the anode reaction is passes through (dispersed) the electrolyte film in a hydrate state of $H^+(xH_2O)$, the hydrogen ion which passed though the electrolyte film is subjected to cathode reaction. As a result, the fuel-cell stack 200 assumes super electricity, and supplies super electricity to the outside load such as a motor.

The reforming reactor 120 of this embodiment mixes methanol (reforming material), vapor and air (gas including oxygen), thereby forming hydrogen-enriched gas by the vapor reforming reaction of methanol and oxidation reaction. The reforming reactor 120 is a so-called auto-thermal type reforming reactor capable of omitting a separate heater or reducing size by compensating an amount of heat required by the vapor reaction (endothermic reaction) using the heat generated by the oxidation reaction (exothermic reaction).

The methanol as the reforming material is injected to an evaporator 150 from the methanol tank into the evaporator 150 by a fuel injector 151, and is vaporized by heat-exchanging with exhaust gas from the combustor 140. The vapor is injected from a water tank into the evaporator 150 by a water injector 152, and is vaporized by heat-exchanging with exhaust gas from the combustor 140. The methanol gas and vapor are sent to an inlet of the reforming reactor 120, and the air 401 is supplied from the compressor 400. The flow rate of the air 401 is adjusted by a flow rate control valve 121.

The vapor reforming reaction of methanol in the reforming reactor 120 simultaneously causes a dissolving reaction of the methanol and a degeneration reaction of the carbon monoxide as shown in the following equations upon reception of methanol and vapor, thereby generating the reformed gas including hydrogen and carbon dioxide:

Methanol reaction: $CH_3OH \rightarrow CO + 2H_2 - 90.0\ kJ/mol$
Degeneration reaction: $CO + H_2O \rightarrow CO_2 + H_2 + 40.5\ kJ/mol$
Total reaction: $CH_3OH + H_2O \rightarrow CO_2 + 3H_2 - 49.5\ kJ/mol$ On the other hand, the oxidation reaction of methanol generates the reformed gas including hydrogen and carbon dioxide by the oxidation reaction as shown the following equation upon reception of methanol and air:

Oxidation reaction: $CH_3OH + 1/2O_2 \rightarrow 2H_2 + CO_2 + 189.5\ kJ/mol$

If carbon monoxide is included in the reformed gas to be supplied from the reforming reactor 120 toward the anode of the fuel-cell stack 200, the fuel-cell is rendered poisonous. Therefore, the carbon monoxide removing reactor 130 is provided in a pipe between the reforming reactor 120 and the fuel-cell stack 200, and the carbon monoxide removing reactor 130 reduces the content of the carbon monoxide. Examples of the carbon monoxide removing reactor 130 is a shifting device for denaturing unreacted carbon monoxide and water in reformed gas 125 obtained by the reforming reactor 120 into hydrogen and carbon dioxide by the same degeneration reaction ($CO + H_2O \rightarrow CO_2 + H_2$), and a selective oxidation device for selectively oxidizing ($CO + 1/2O_2 \rightarrow CO_2$) carbon monoxide included in the reformed gas which passed through the shifting device into carbon dioxide. For the latter selective oxidation device, air 402 is supplied to the carbon monoxide removing reactor 130 from the compressor 400. The flow rate of the air 402 is adjusted by a flow rate control valve 131.

Excessive reformed gas 205 discharged from the anode of the fuel-cell stack 200 is supplied to the combustor 140 together with air 403 from the compressor 400 and burning fuel such as methanol injected from a fuel injector 145, and the reformed gas 205 is processed in the combustor 140. The exhaust gas at that time is sent to the evaporator 150, and utilized for vaporization energy of methanol and water of the reforming reactor 120. The flow rate of the air 403 supplied from the compressor 400 to the combustor 140 is adjusted by a flow rate control valve 141.

The operation of the fuel-cell system 1 is controlled by the control unit 300. Sent to the control unit 300 are a signal 301 from a temperature sensor which detects a temperature of cooling water of the fuel-cell stack 200, a signal 302 from a sensor which detects an accelerator opening of the vehicle, and a signal 303 from a vehicle speed sensor which detects running speed of the vehicle.

The control unit 300 calculates an amount of generated hydrogen using the accelerator opening sensor 302 and the vehicle speed sensor 303, and opens the fuel injector 151, the water injector 152 and the flow rate control valve 121 of the air 401, thereby supplying the fuel, water and air required by the reforming reactor 120.

The reformed gas 125 including a large amount of hydrogen generated by the reforming reactor 120 is sent to the carbon monoxide removing reactor 130, and the carbon monoxide is selectively oxidized by air whose flow rate is controlled by the flow rate control valve 131, the reformed gas 135 whose concentration of carbon monoxide is reduced to a low level is formed, and supplied to the fuel-cell stack 200.

The reformed gas 205 whose electricity was taken out by the fuel-cell stack 200 and whose hydrogen concentration was reduced to the low level is sent to the combustor 140, and hydrogen included therein is oxidized by air whose flow rate was controlled by the flow rate control valve 141, and becomes safe water and is discharged out as exhaust gas. Utilizing heat of the exhaust gas from the combustor 140, fuel and water sent to the reforming reactor 120 are evaporated by the evaporator 150.

The operation will be explained next.

The following control is carried out after warm-up operation. First, in step 1, a temperature TW of the cooling water is taken out by the cooling water temperature sensor of the fuel-cell stack 200. In step 2, the temperature TW and a warm-up completion temperature TWO, thereby judging whether the warm-up operation was completed. Then, time is marked until the actual cooling water temperature TW becomes equal to or higher than the warm-up completion temperature TWO.

Next, in step 3, the signal 302 of the accelerator opening TVO by the accelerator opening sensor and the signal 303 of the vehicle speed VS by the vehicle speed sensor are taken out. In step 4, it is judged whether the current state is a starting state of this control. This state includes a state in which although the moving body is running, a load as a vehicle is 0, and it is unnecessary to drive the reforming system, for example, a deceleration state or a downhill running state.

If step 4, if the accelerator-opening TVO is 0, i.e., if the accelerator is in its front close position and the vehicle speed VS is equal to or greater than a set vehicle speed VS0, the processing is proceeded to step 5.

If it is judged that the state is in this state in step 4, the fuel injector 151 and the water injector 152 provided in the evaporator 150 are controlled to reduce the amount of each of fuel and water to be supplied to the reforming reactor 120 to a small value. This can easily be carried out by intermittently supplying the fuel and water.

Then, by controlling the flow rate control valve 121, the flow rate of the air 401 to be supplied from the compressor 400 to the reforming reactor 120 is adjusted, the hydrogen gas is generated by this reaction in the reforming reactor 120, and the reforming reactor 120 is heated by this reaction heat. At the same time, the hydrogen gas is supplied to the carbon monoxide removing reactor 130 and the combustor 140.

At that time, the air 402 and 403 is sent also to the carbon monoxide removing reactor 130 and the combustor 140 by controlling the flow rate control valves 131 and 141, the hydrogen gas generated by the reforming reactor 120 is oxidized, and the carbon monoxide removing reactor 130 and the combustor 140 are heated by this reaction heat.

By utilizing the reaction heat generated by the hydrogen gas and oxidization reaction heat of the hydrogen gas, it is possible to heat the reforming reactor 120, the carbon monoxide removing reactor 130 and the combustor 140 with extremely small amount of combustion consumption.

A value of intermittent time and injection time/injection amount of fuel supplied to the reforming reactor 120 can be calculated theoretically using the thermal capacity, heat release amount, and chemical reaction formula of the carbon monoxide removing reactor 130 and the combustor 140, and this is defined as a constant.

Although the idling control is carried out by the reforming reactor 120, the carbon monoxide removing reactor 130 and the combustor 140 in the above embodiment, this control can also be carried out only by the reforming reactor 120 and the carbon monoxide removing reactor 130.

Second Embodiment

Figure 3:
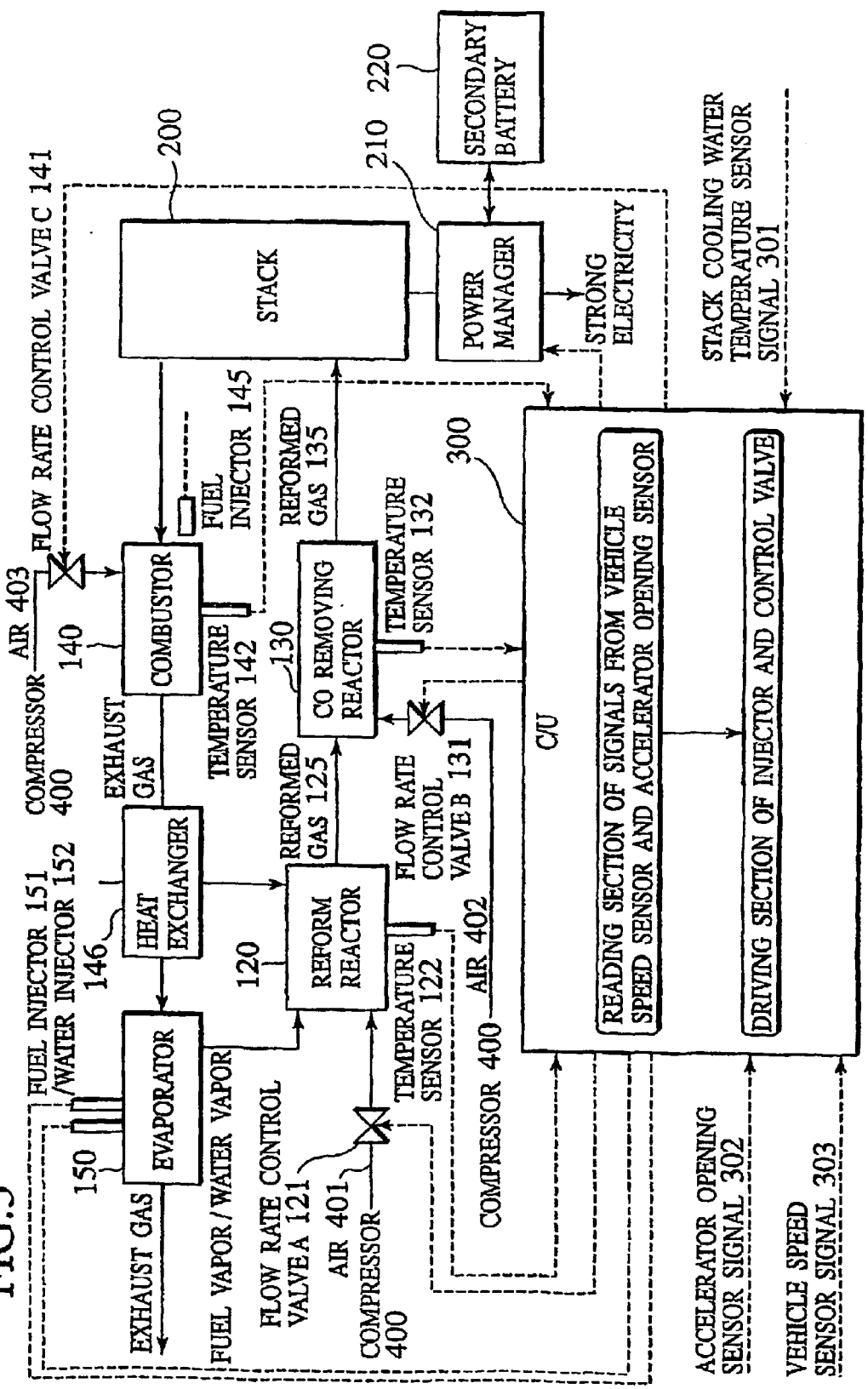
FIG. 3 is a block diagram showing a fuel-cell system of a second embodiment of the present invention.

FIG. 3 is a block diagram showing a fuel-cell system of a second embodiment of the present invention. The same members as those in the first embodiment are designated with the same symbols. In the fuel-cell system 1 of this embodiment, a reforming reactor 120 only using vapor reforming reaction is used as the reforming reactor 120 instead of the auto-thermal type reactor.

When the reforming reaction for generating the hydrogen-rich gas is only the vapor reforming reaction which is an endothermic reaction, means for heating the reforming reactor 120 at an appropriate temperature is required.

Thereupon, in this embodiment, a heat exchanger 146 is provided at downstream of the combustor 140, a heat catalyst such as silicon oil is heated by exhaust gas discharged from the combustor 140, this heat catalyst is sent to the reforming reactor 120, thereby supplying heat.

The control manner of the operation of the control unit 300 when the apparatus is operated using both partial oxidization and vapor reforming or using only the partial oxidization is the same as that of the first embodiment. When the apparatus is driven only by the endothermic reaction such as the vapor reforming reaction, the air supply to the reforming reactor 120 should always be stopped, at the step 5 in FIG. 20.

Third Embodiment

Figure 4:
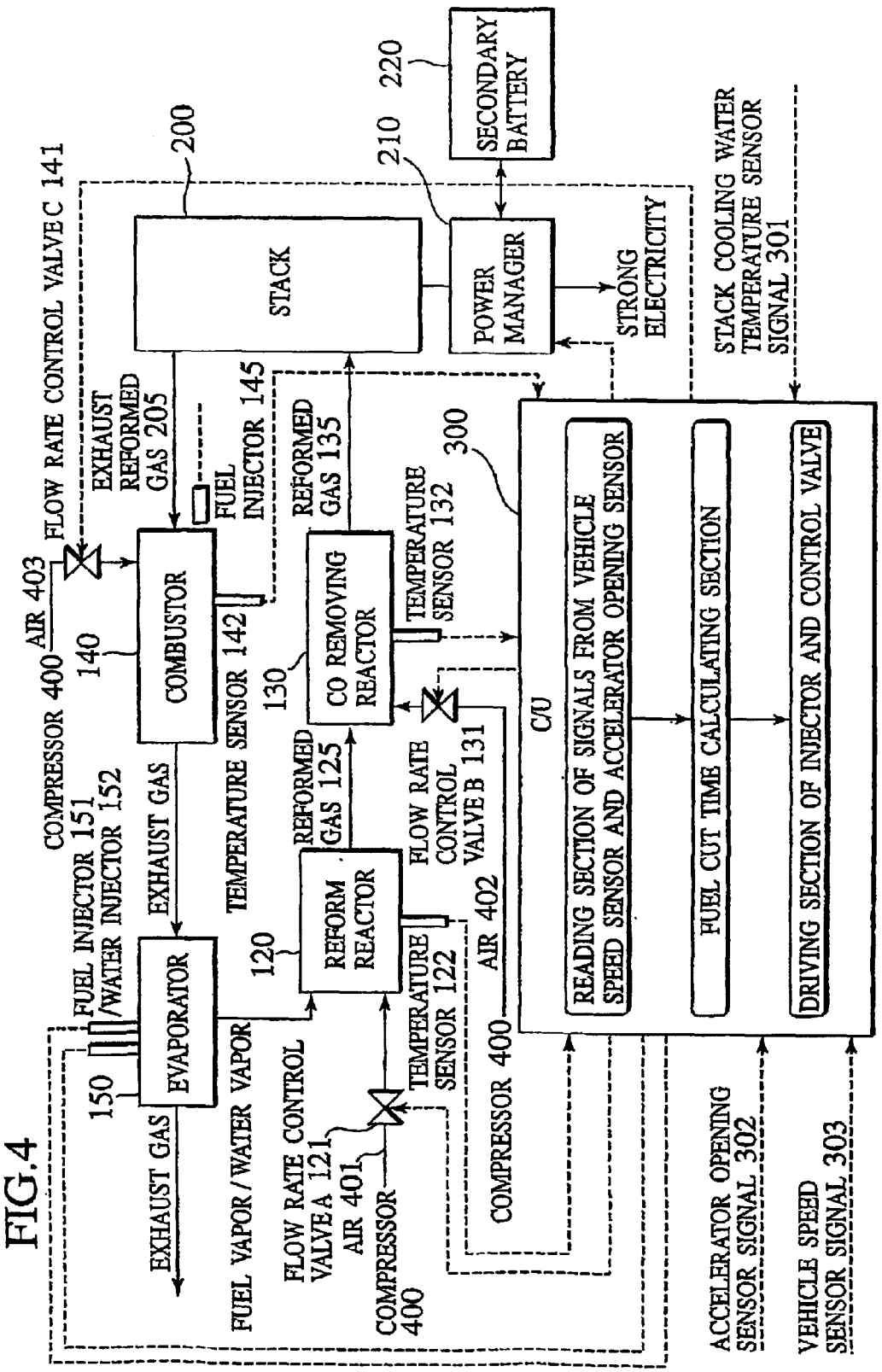
FIG. 4 is a block diagram showing a fuel-cell system of a third embodiment of the present invention.
Figure 5:
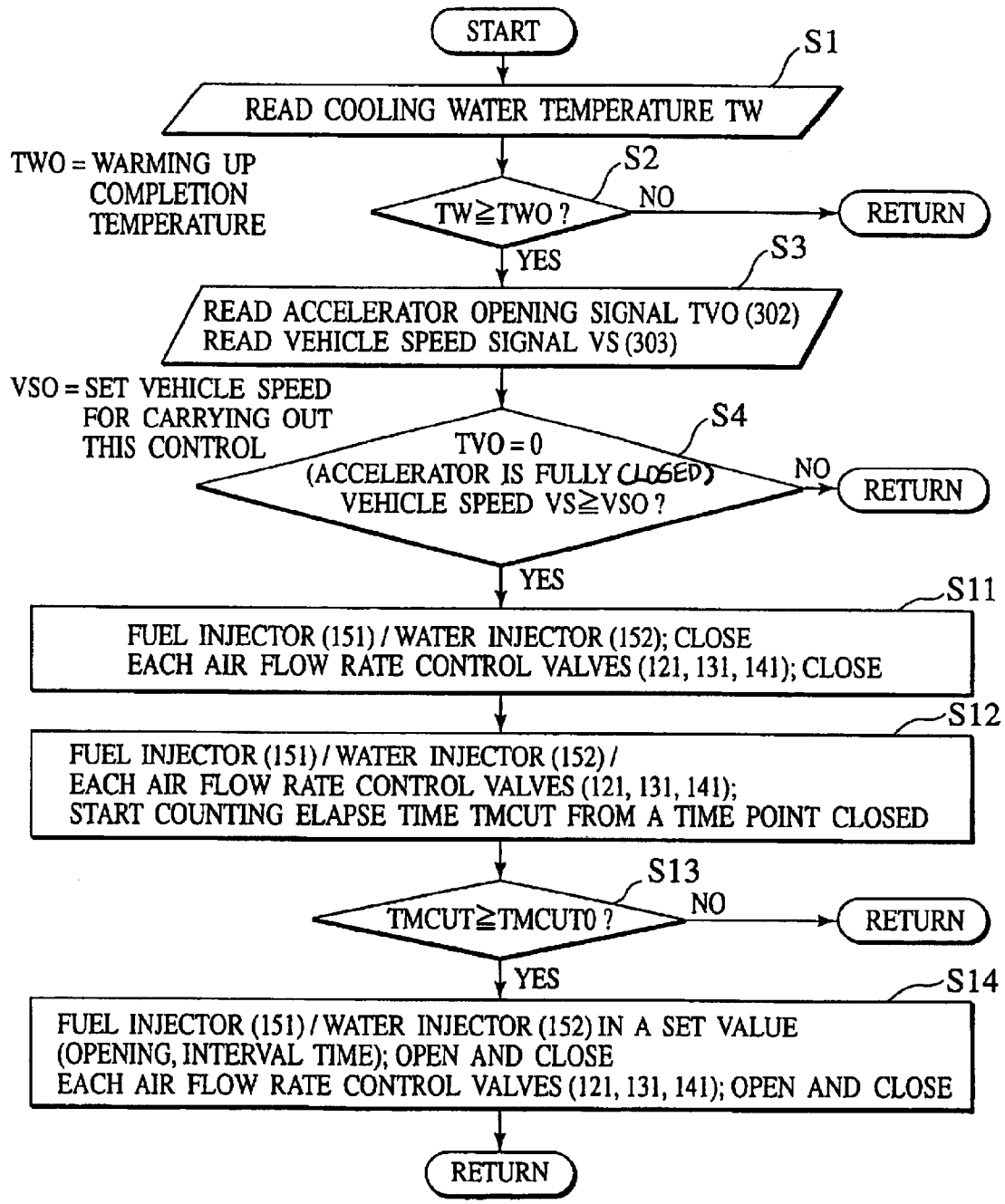
FIG. 5 is a flowchart showing operation of the third embodiment of the invention.
Figure 6:
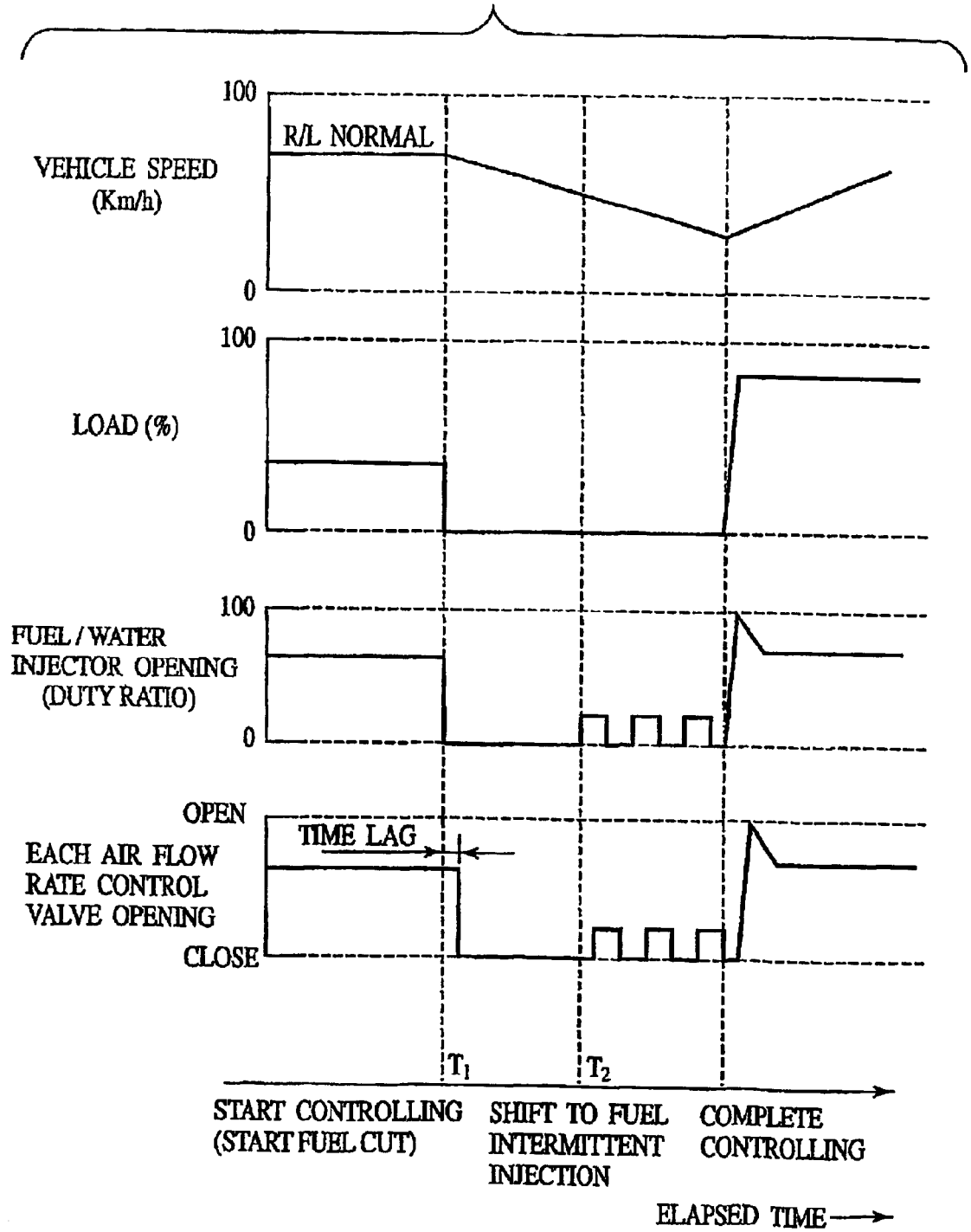
FIG. 6 is a control time chart of the third embodiment of the invention.

FIG. 4 is a block diagram showing a fuel-cell system of a third embodiment of the present invention, FIG. 5 is a flowchart showing operation of the embodiment, and FIG. 6 is a control time chart of the embodiment.

The basic structure of the fuel-cell system 1 of this embodiment is the same as that of the fuel-cell system 1 of the first embodiment, and the same members as those in the first embodiment are designated with the same symbols. This embodiment is different from the first embodiment in the control flow of the control unit 300.

That is, the procedures from steps 1 to 4 are the same as the steps 1 to 4 shown in FIG. 2, and it is judged in step 4 whether the acceleration opening TVO is 0, i.e., whether the accelerator is fully closed and the vehicle speed VS is equal to or greater than the set vehicle speed VS0.

In order to reduce the fuel consumption as compared with the first embodiment, in step 11, all of the fuel injector 151, the water injector 152 and the flow rate control valves 121, 131 and 141 are fully closed, and supply of the fuel, water and air to the reforming reactor 120 is cut (T1 in FIG. 6).

In step 12, elapsed time TMCUT is counted from the starting time of the fully closing operation of the fuel injector 151, the water injector 152 and the flow rate control valves 121, 131 and 141, and if a predetermined time TMCUT0 was elapsed in step 13, even if the accelerator opening is 0 at this time, the supply of the fuel, water and air to the reforming reactor 120 is forcibly started in step 14 (T2 in FIG. 6). The supply amount at that time can be obtained by the same calculation as that of the first embodiment.

If the cut time of the fuel, water and air is defined as a constant while assuming several driving conditions, the cut time can be simplified in terms of control.

Fourth Embodiment

Figure 7:
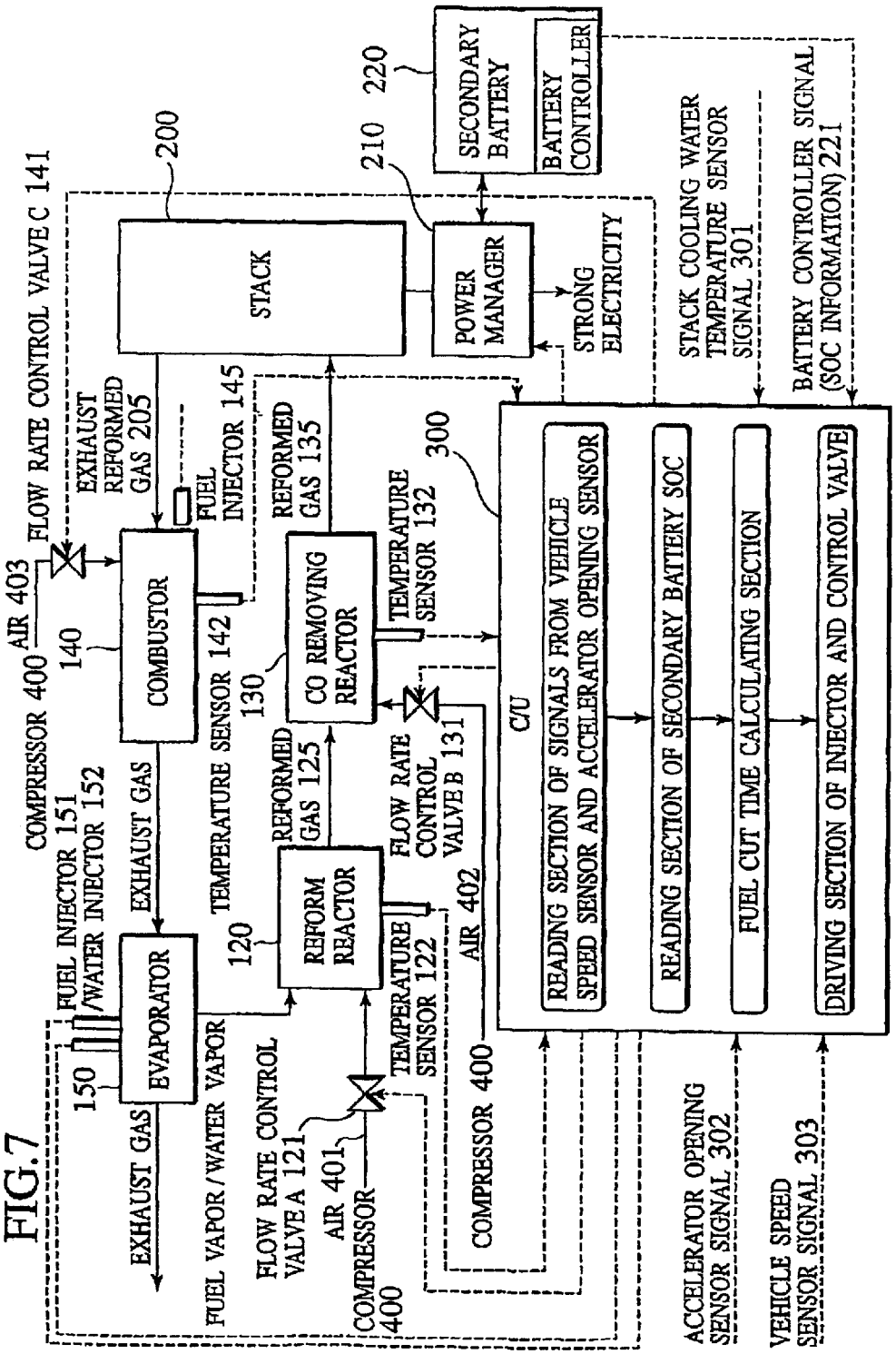
FIG. 7 is a block diagram showing a fuel-cell system of a fourth embodiment of the present invention.
Figure 8:
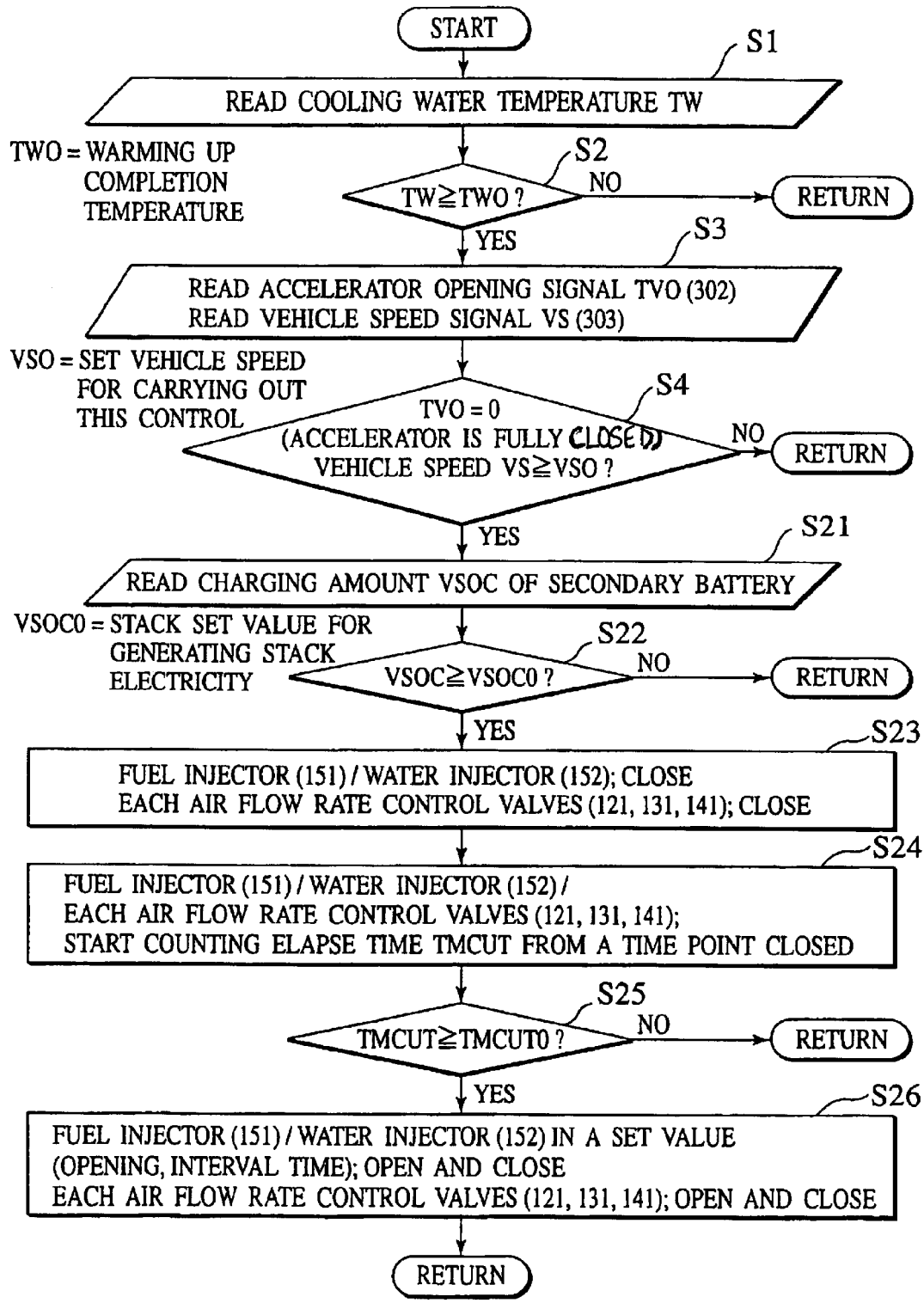
FIG. 8 is a flowchart showing operation of the fourth embodiment of the invention.

FIG. 7 is a block diagram showing a fuel-cell system of a fourth embodiment of the present invention, and FIG. 8 is a flowchart showing operation of the embodiment. The basic structure of a fuel-cell system 1 of this embodiment is the same as that of the fuel-cell system 1 of the first embodiment, and the same members as those in the first embodiment are designated with the same symbols. The fourth embodiment is different from the first embodiment in that a signal 221 from a battery controller which detects a charging state of the secondary battery 220 is taken in the control unit 300 and the control flow of the control unit 300.

That is, the procedures from steps 1 to 4 are the same as the steps 1 to 4 shown in FIG. 2, and it is judged in step 4 whether the acceleration opening TVO is 0, i.e., whether the accelerator is fully closed and the vehicle speed VS is equal to or greater than the set vehicle speed VS0.

Then, in this step, the battery controller signal 221 is read at step 21, thereby detecting a charging amount VSOC of the secondary battery 220, and in subsequent step 22, if the charging amount VSOC is less than a set value VSOC0 at which the electricity should be generated by the fuel-cell stack 200, the procedure is not proceeded to step 23, and returns to step 1.

That is, in this embodiment, not only by regenerative charging but also by temporarily stopping (delaying) the cut or reduction of fuel and air at the time of charging failure, electricity is generated by the fuel-cell stack 200 and the secondary battery 220 is charged. With this feature, the secondary battery 220 can be fully charged swiftly.

When the charging amount of the secondary battery 220 is equal to or greater than the set value VSOC0 in step 22, the control in each of steps 23 and 26 is carried out like steps 11 to 14 in the third embodiment.

Fifth Embodiment

Figure 9:
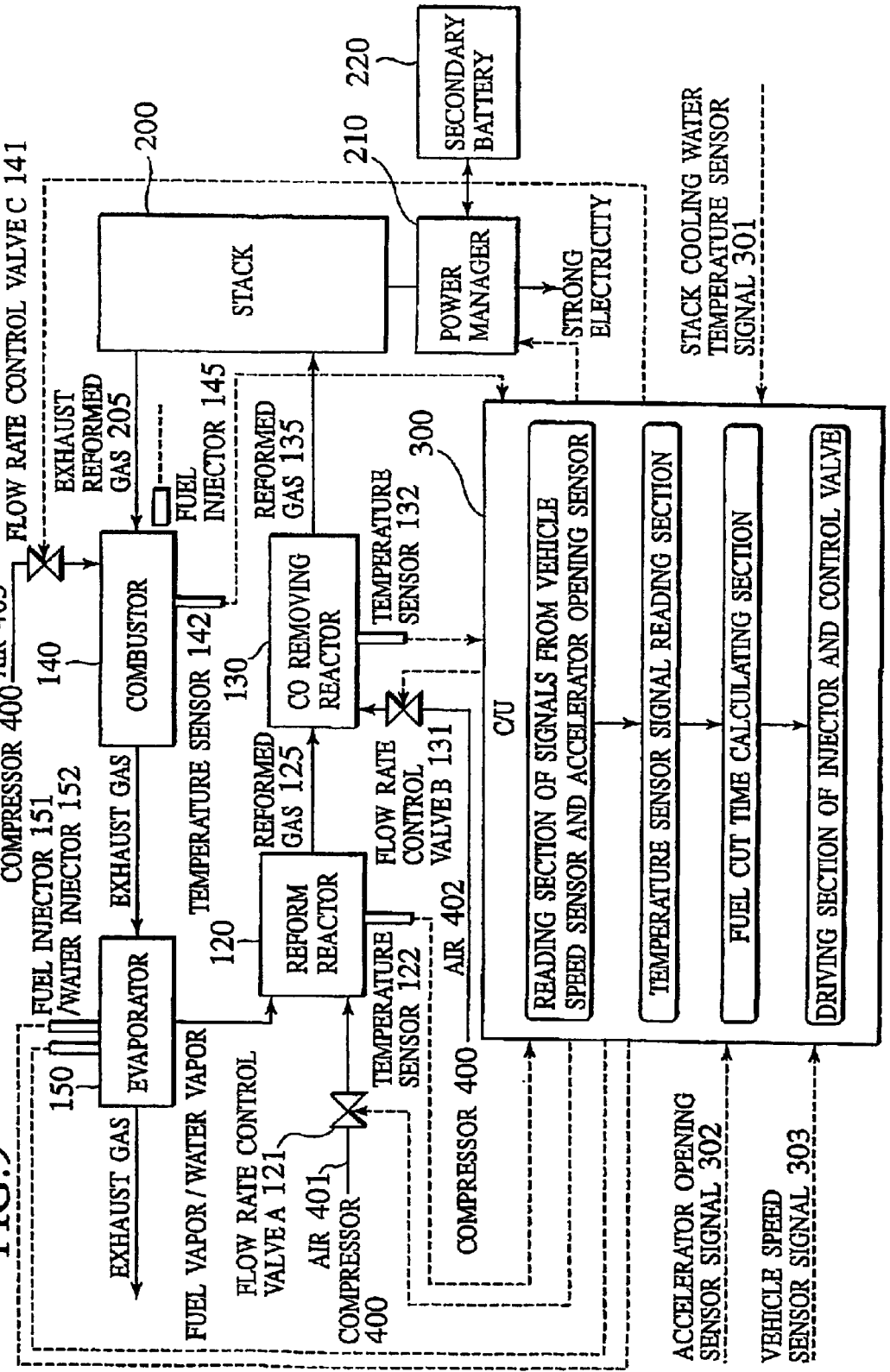
FIG. 9 is a block diagram showing a fuel-cell system of a fifth embodiment of the present invention.
Figure 10:
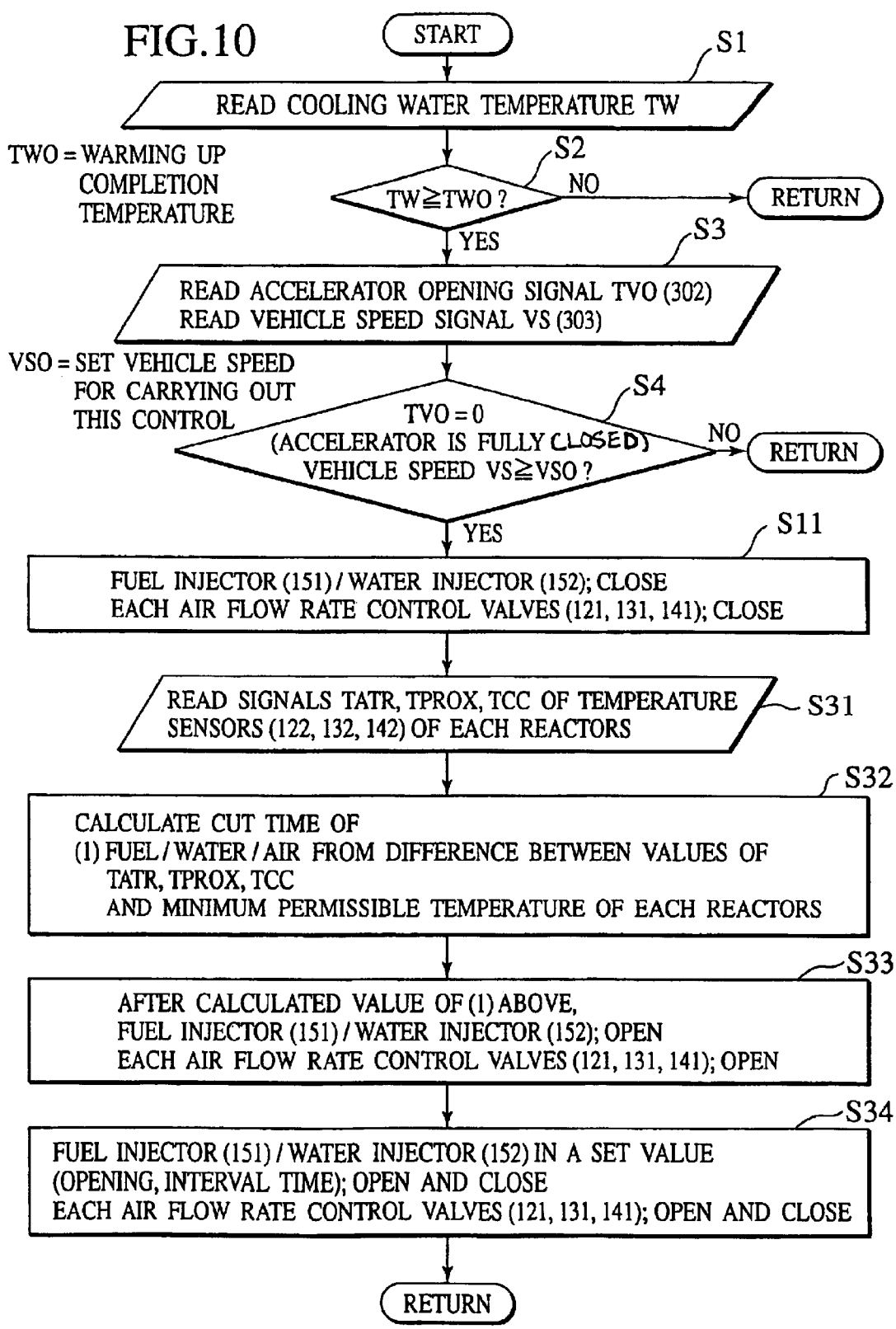
FIG. 10 is a flowchart showing operation of the fifth embodiment of the invention.

FIG. 9 is a block diagram showing a fuel-cell system of a fifth embodiment of the present invention, and FIG. 10 is a flowchart showing operation of the embodiment. The basic structure of a fuel-cell system 1 of this embodiment is the same as that of the fuel-cell system 1 of the first embodiment, and the same members as those in the first embodiment are designated with the same symbols. The fifth embodiment is different from the first embodiment in that the reforming reactor 120, the carbon monoxide removing reactor 130 and the combustor 140 are respectively provided with temperature sensors 122, 132 and 142, and signals from these temperature sensors 122, 132 and 142 are sent to the control unit 300, and the control flow of the control unit 300.

That is, the procedures from steps 1 to 4 are the same as the steps 1 to 4 shown in FIG. 2, and it is judged in step 4 whether the acceleration opening TVO is 0, i.e., whether the accelerator is fully closed and the vehicle speed VS is equal to or greater than the set vehicle speed VS0.

In step 11, all of the fuel injector 151, the water injector 152 and the flow rate control valves 121, 131 and 141 are fully closed, and supply of the fuel, water and air to the reforming reactor 120 is cut.

When the supply cut of methanol, water and air is started, temperatures in the temperature sensor 122 of the reforming reactor 120, the temperature sensor 132 of the carbon monoxide removing reactor 130 and the temperature sensor 142 of the combustor 140 are read into the control unit 300 in step 31. In step 32, a cut time is determined based on a difference between minimum permissible temperatures of the reactors 120, 130 and 140.

Then, if the calculated cut time was elapsed, the procedure is proceeded to step 33, where all of the fuel injector 151, the water injector 152 and the flow rate control valves 121, 131 and 141 are opened, and the supply of fuel, water and air to the reforming reactor 120 is restarted. In subsequent step 34, if a predetermined time was elapsed, the fuel injector 151, the water injector 152 and the flow rate control valves 121, 131 and 141 are intermittently closed, and fuel, water and air to the reforming reactor 120 are reduced.

With this feature, the cut time can be elongated, and the fuel consumption can further be reduced.

Sixth Embodiment

Figure 11:
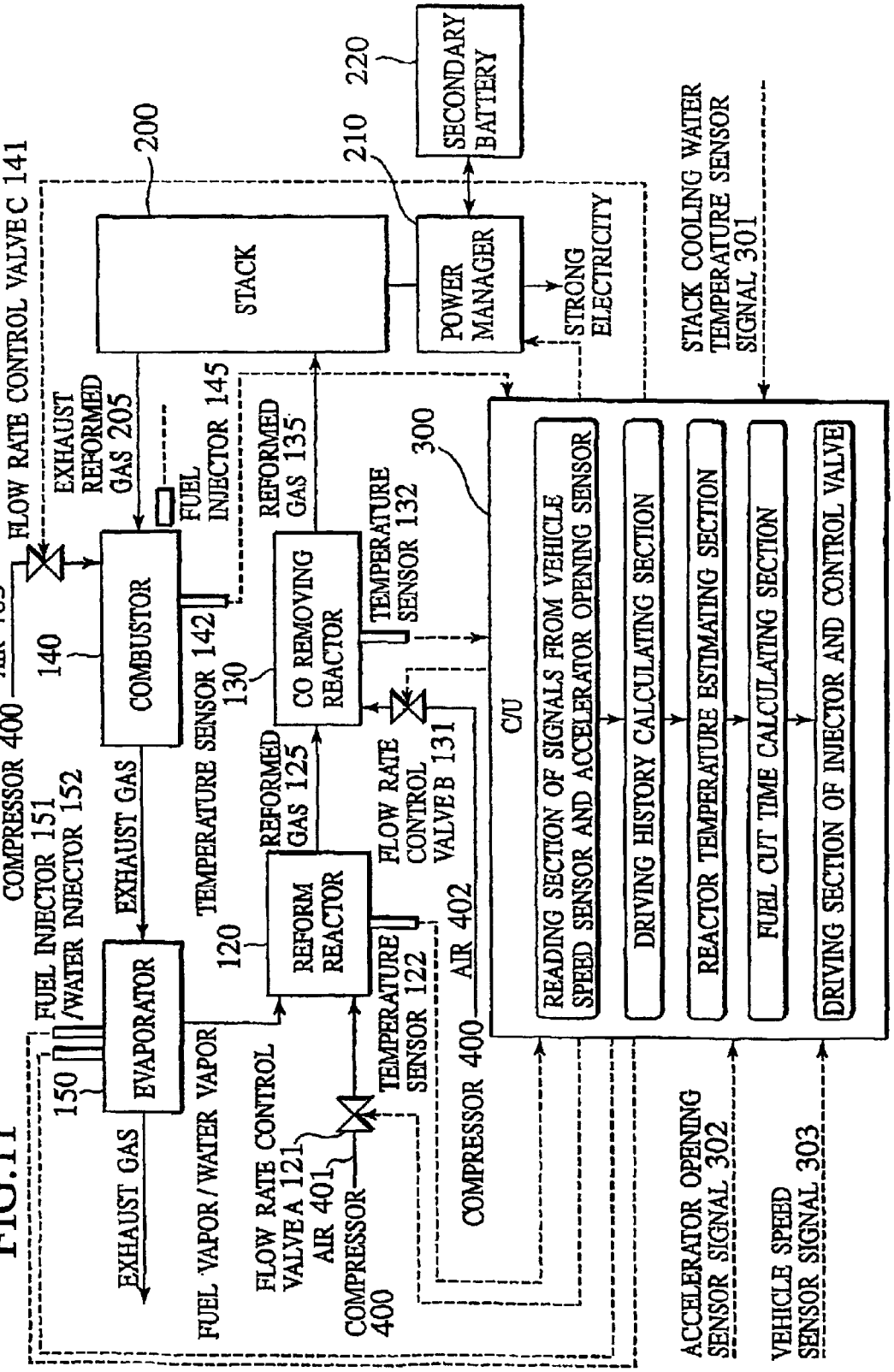
FIG. 11 is a block diagram showing a fuel-cell system of a sixth embodiment of the present invention.
Figure 12:
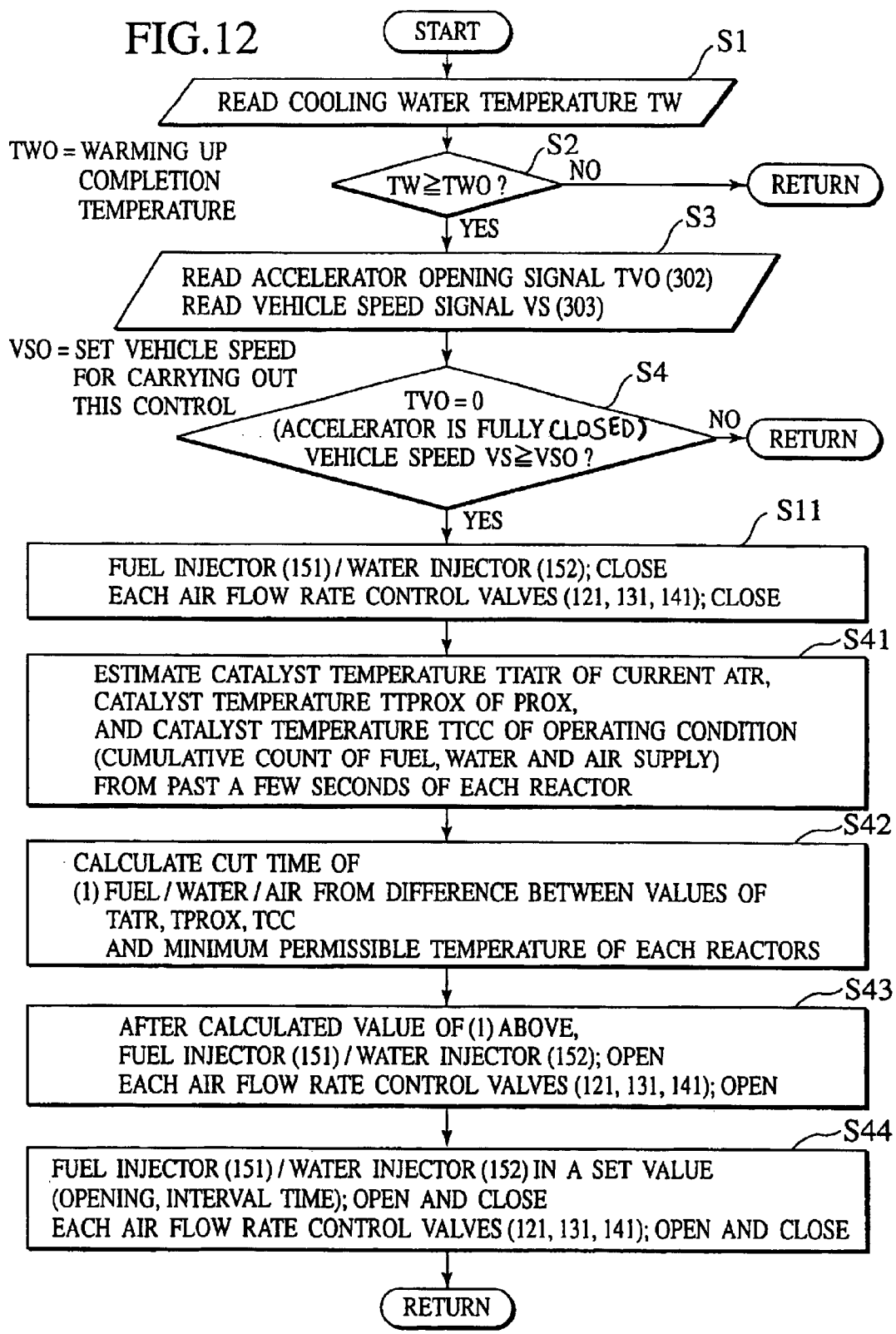
FIG. 12 is a flowchart showing operation of the sixth embodiment of the invention.

FIG. 11 is a block diagram showing a fuel-cell system of a sixth embodiment of the present invention, and FIG. 12 is a flowchart showing operation of the embodiment. The basic structure of a fuel-cell system 1 of this embodiment is the same as that of the fuel-cell system 1 of the fifth embodiment, and the same members as those in the fifth embodiment are designated with the same symbols. The sixth embodiment is different from the fifth embodiment in that driving history of each of the reforming reactor 120, the carbon monoxide removing reactor 130 and the combustor 140 is always monitored, and the cut time is determined based on the difference between the catalyst temperature and the minimum permissible temperature of each of the reactors 120, 130 and 140.

That is, the procedures from steps 1 to 4 are the same as the steps 1 to 4 shown in FIG. 2, and it is judged in step 4 whether the acceleration opening TVO is 0, i.e., whether the accelerator is fully closed and the vehicle speed VS is equal to or greater than the set vehicle speed VS0.

In step 11, all of the fuel injector 151, the water injector 152 and the flow rate control valves 121, 131 and 141 are fully closed, and supply of the fuel, water and air to the reforming reactor 120 is cut.

When the supply cut of methanol, water and air is started, in step 41, a temperature of each of current reactors 120, 130 and 140 is estimated based on the driving history of each of the reforming reactor 120, the carbon monoxide removing reactor 130 and the combustor 140, i.e., the cumulative sum of supply amount of fuel, water and air during last some tens of seconds.

In step 42, the cut time is determined based on a difference between the estimated temperature and the minimum permissible temperature of each of the reactors 120, 130 and 140.

Then, if the calculated out time was elapsed, the procedure is proceeded to step 43, where all of the fuel injector 151, the water injector 152 and the flow rate control valves 121, 131 and 141 are opened, and the supply of fuel, water and air to the reforming reactor 120 is restarted. In subsequent step 44, if a predetermined time was elapsed, the fuel injector 151, the water injector 152 and the flow rate control valves 121, 131 and 141 are intermittently closed, and fuel, water and air to the reforming reactor 120 are reduced.

With this feature, the cut time can be elongated, and the fuel consumption can further be reduced.

Seventh Embodiment

Figure 13:
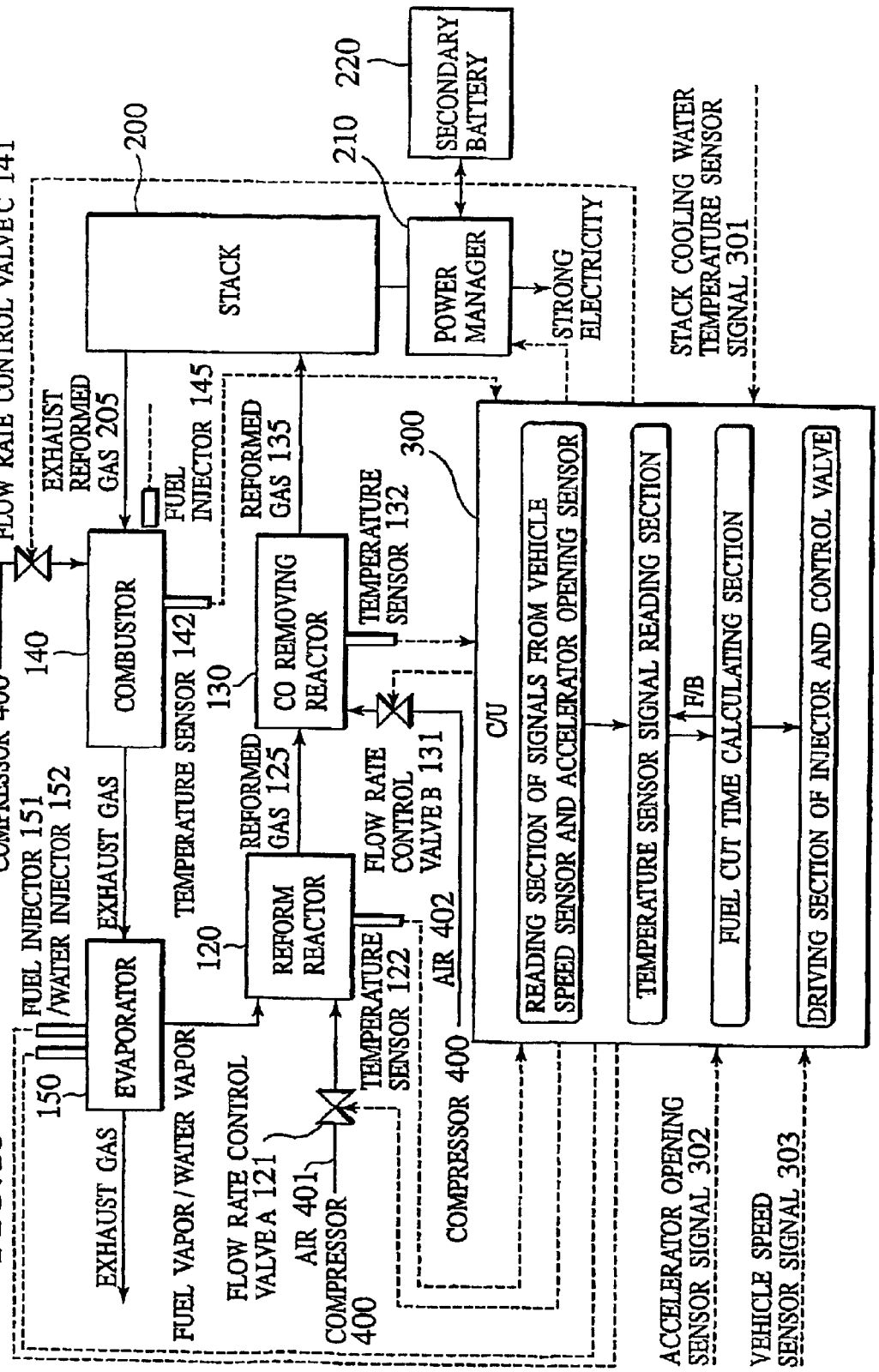
FIG. 13 is a block diagram showing a fuel-cell system of a seventh embodiment of the present invention.
Figure 14:
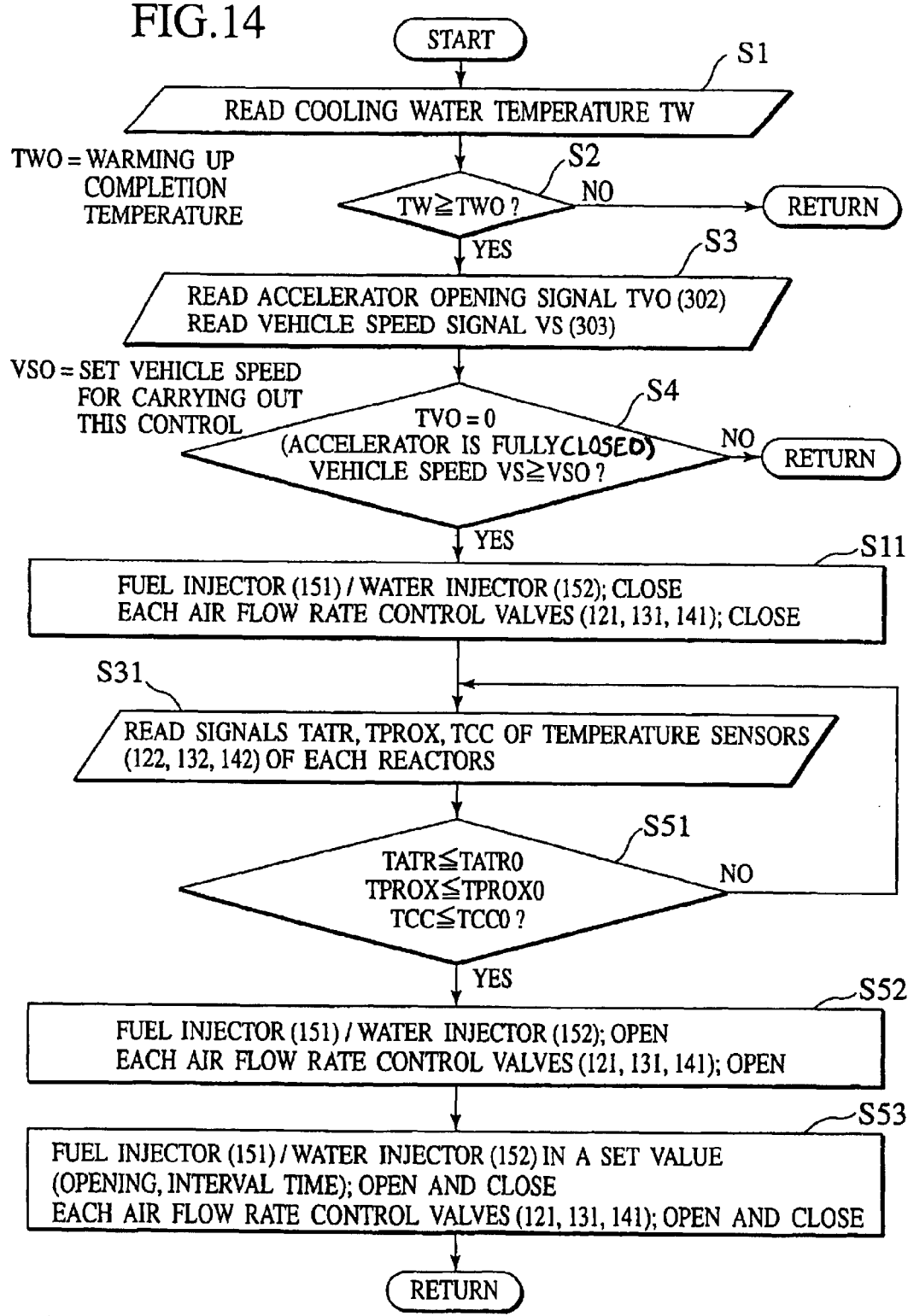
FIG. 14 is a flowchart showing operation of the seventh embodiment of the invention.

FIG. 13 is a block diagram showing a fuel-cell system of a seventh embodiment of the present invention, and FIG. 14 is a flowchart showing operation of the embodiment. The basic structure of a fuel-cell system 1 of this embodiment is the same as that of the fuel-cell system 1 of the fifth embodiment, and the same members as those in the fifth embodiment are designated with the same symbols. The seventh embodiment is different from the fifth embodiment in that the actual temperature of each of the reforming reactor 120, the carbon monoxide removing reactor 130 and the combustor 140 is always monitored such that the temperature becomes equal to or higher than the minimum permissible temperature of each reactor, and feedback control is carried out.

That is, the procedures from steps 1 to 4 are the same as the steps 1 to 4 shown in FIG. 10, and it is judged in step 4 whether the acceleration opening TVO is 0, i.e., whether the accelerator is fully closed and the vehicle speed VS is equal to or greater than the set vehicle speed VS0.

In step 11, all of the fuel injector 151, the water injector 152 and the flow rate control valves 121, 131 and 141 are fully closed, and supply of the fuel, water and air to the reforming reactor 120 is cut.

When the supply cut of methanol, water and air is started, in step 31, inner temperatures TATR, TPROX and TCC are read into the control unit 300 from the temperature sensor 122 of the reforming reactor 120, the temperature sensor 132 of the carbon monoxide removing reactor 130 and the temperature sensor 142 of the combustor 140, and the supply cut of the methanol, water and air in step 11 is connected until the temperature becomes equal to or lower than the minimum permissible temperatures TATR0, TPROX0 and TCC0 of the reactors 120, 130 and 140.

If the inner temperatures of the reactors 120, 130 and 140 become equal to or lower than the minimum permissible temperatures TATR0, TPROX0 and TCC0, the procedure is proceeded to step 52, where all of the fuel injector 151, the water injector 152 and the flow rate control valves 121, 131 and 141 are opened, and the supply of fuel, water and air to the reforming reactor 120 is restarted. In subsequent step 53, if a predetermined time was elapsed, the fuel injector 151, the water injector 152 and the flow rate control valves 121, 131 and 141 are intermittently closed, and fuel, water and air to the reforming reactor 120 are reduced.

With this feature, the cut time can be elongated to the utmost, and the fuel consumption can further be reduced.

Eighth Embodiment

Figure 15:
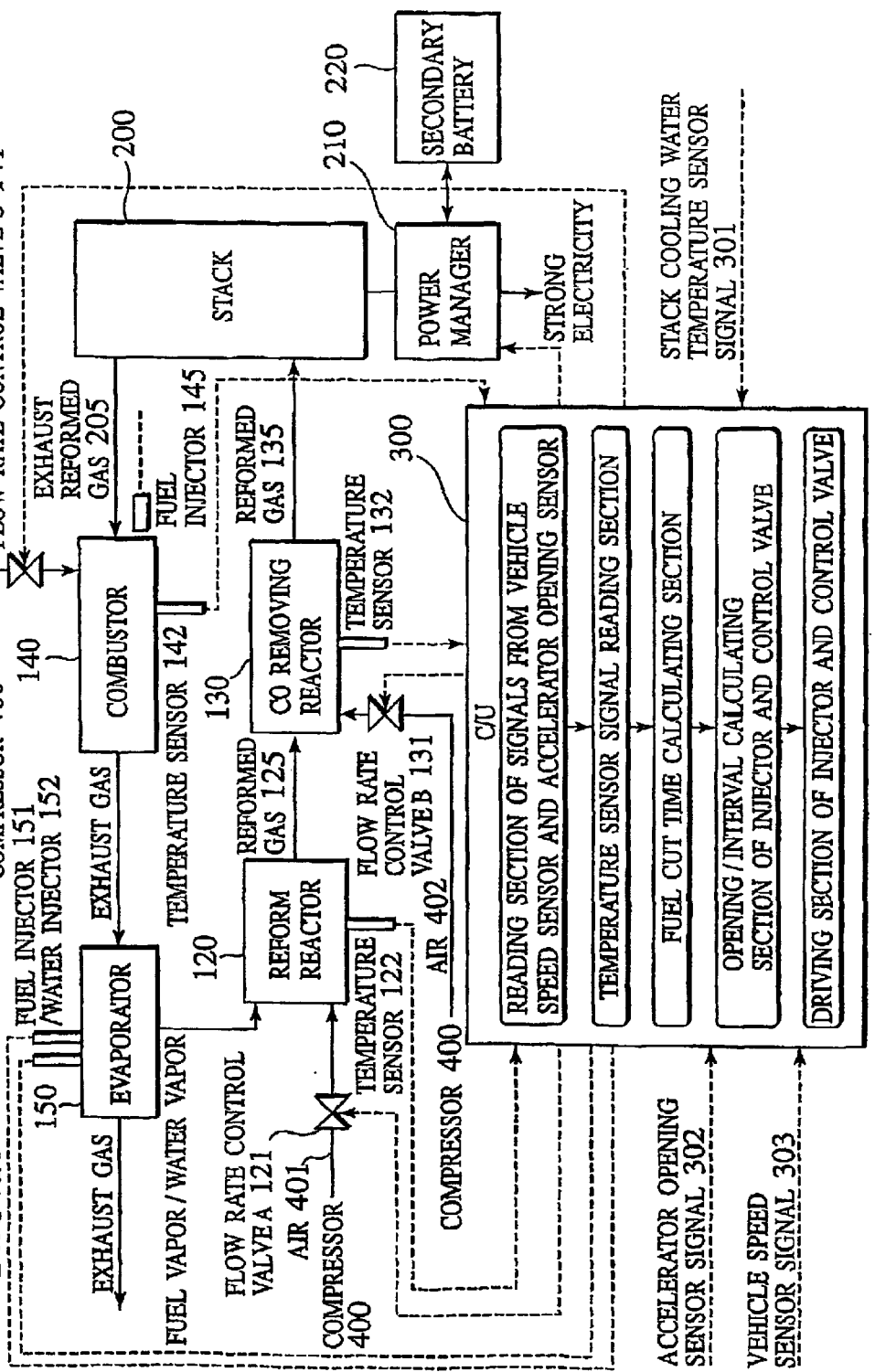
FIG. 15 is a block diagram showing a fuel-cell system of a eight embodiment of the present invention.

FIG. 15 is a block diagram showing a fuel-cell system of a eight embodiment of the present invention, and FIG. 16 is a flowchart showing operation of the embodiment. The basic structure of a fuel-cell system 1 of this embodiment is the same as that of the fuel-cell system 1 of the fifth embodiment, and the same members as those in the fifth embodiment are designated with the same symbols. The eighth embodiment is different from the fifth embodiment in that intermittent time, injection time/injection amount after the supply is started at a temperature in a catalyst in each reactor is corrected.

That is, the procedures from steps 1 to 4 are the same as the steps 1 to 4 shown in FIG. 2, and it is judged in step 4 whether the acceleration opening TVO is 0, i.e., whether the accelerator is fully closed and the vehicle speed VS is equal to or greater than the set vehicle speed VS0.

In step 11, all of the fuel injector 151, the water injector 152 and the flow rate control valves 121, 131 and 141 are fully closed, and supply of the fuel, water and air to the reforming reactor 120 is cut.

When the supply cut of methanol, water and air is started, in step 31, the inner temperatures of are read into the control unit 300 from the temperature sensor 122 of the reforming reactor 120, the temperature sensor 132 of the carbon monoxide removing reactor 130 and the temperature sensor 142 of the combustor 140. In step 61, the cut time is determined from a difference between the inner temperatures and the minimum permissible temperatures of the reactors 120, 130 and 140. At the same time, re-supply amounts of fuel, water and air are calculated from a difference between the inner temperatures and the minimum permissible temperatures of the reactors 120, 130 and 140.

If the calculated cut time was elapsed, the procedure is proceeded to step 62, where all of the fuel injector 151, the water injector 152 and the flow rate control valves 121, 131 and 141 are opened, and the supply of fuel, water and air to the reforming reactor 120 is restarted.

In step 63, the fuel injector 151, the water injector 152 and the flow rate control valves 121, 131 and 141 are intermittently closed based on the re-supply amounts of the fuel, water and air obtained in step 61, and the amounts of fuel, water and air to the reforming reactor 120 are reduced.

With this feature, since injection time/injection amount after the supply is started at a temperature in a catalyst in each reactor is corrected, the controlling performance is enhanced, and overshoot of the catalyst temperature can be reduced.

The above embodiments are described for facilitating the understandings of the present invention, and the present invention is not limited to the embodiments. Therefore, each element disclosed in the embodiments includes all design modifications and equivalents belonging to technical range of the present invention.

The entire content of a Japanese Application No. P2000-159595 with a filing date of Mar. 28, 2000 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

INDUSTRIAL APPLICABILITY

As explained above, the present invention provide a fuel-cell system for a moving body and a control method of the system capable of idling the moving body in a most effective manner in terms of fuel economy and re-acceleration when an accelerator is closed. Thus, a wide applicability as well as a moving body is expected.

What is claimed is:

1. fuel-cell system for a moving body comprising:
   a reforming reactor for reforming fuel to generate gas including hydrogen;
   a carbon monoxide removing reactor for removing carbon monoxide included in a reformed gas generated in said reforming reactor;
   a fuel-cell for generating electric power using the reformed gas which passed through said carbon monoxide removing reactor and gas including oxygen;
   a compressor for supplying the gas including oxygen to said reforming reactor, said carbon monoxide removing reactor and said fuel-cell;
   a running state detecting section for detecting a running state of said moving body;
   an accelerator opening detecting section for detecting accelerator opening of said moving body;
   a control section, wherein when said control section judged that said moving body was running and said accelerator was closed based on information of said running state detecting section and said accelerator opening detecting section, said control section supplies fuel, water and gas including oxygen, or fuel and the gas including oxygen to said reforming reactor such that minimum hydrogen required for maintaining a temperature of said reforming reactor is generated, and supplies minimum gas including oxygen required for maintainin a temperature of said carbon monoxide removing reactor to said carbon monoxide removing reactor; and
   a combustor for reaction processing discharged reformed gas and discharged gas including oxygen discharged from said fuel-cell, wherein
   said control section supplies minimum gas including oxygen required for maintaining a temperature of said combustor when it is judged that said moving body was running and said accelerator was closed based on the information of said running state detecting section and said accelerator opening detecting section.

2. A fuel-cell system for a moving body according to claim 1, wherein
   the reforming reaction in said reforming reactor is only an endothermic reaction, and said fuel-cell system further includes a system for recovering heat obtained from said combustor into said reforming reactor.

3. A fuel-cell system for a moving body according to claim 1, further comprising an evaporator for recovering heat of exhaust gas discharged from said combustor to evaporate said fuel and water.

4. A fuel-cell system for a moving body according to claim 1, further comprising a temperature detecting section for detecting a temperature of each of said carbon monoxide removing reactor and said combustor, wherein when said control section judged that said moving body was running and said accelerator was closed, said control section once stops the supply of fuel, water and air, or fuel and air, or fuel and water, and when said control section judged that a temperature of each of said carbon monoxide removing reactor and said combustor became equal to or lower than a predetermined temperature based on information of said temperature detecting section, the supply of fuel, water and air, or fuel and air, or fuel and water is started.

5. A fuel-cell system for a moving body according to claim 1, wherein said control section intermittently supplies fuel, water and air, or fuel and air, or fuel and water.

6. A fuel-cell system for a moving body according to claim 1, further comprising a second battery, and a charging state detecting section for detecting a charging state of said secondary battery, when said control judged that said accelerator was closed and said secondary battery was charged insufficiently, said control section stops the supply of fuel, water and air, or fuel and air, or feel and water.

7. A fuel-cell system for a moving body according to claim 4, wherein a time period during which the supply of fuel, water and air, or fuel and air, or fuel and water is determined by a constant assuming several driving conditions.

8. A fuel-cell system for a moving body according to claim 4, wherein a time period during which the supply of fuel, water and air, or fuel and air, or fuel and water is calculated based on temperatures of said reforming reactor, said carbon monoxide removing reactor and said combustor when said accelerator is closed.

9. A fuel-cell system for a moving body according to claim 4, wherein a time period during which the supply of fuel, water and air, or fuel and air, or fuel and water is calculated while estimating temperatures of said reforming reactor, said carbon monoxide removing reactor and said combustor when said accelerator is closed based on history of a driving condition immediately before said accelerator is closed.

10. A fuel-cell system for a moving body according to claim 1, wherein immediately after said accelerator was closed, said control section once stops the supply of fuel, water and air, or fuel and air, or fuel and water, and when said control section judged that a temperature of each of said carbon monoxide removing reactor and said combustor became equal to or lower than a predetermined temperature, the supply of fuel, water and air, or fuel and air, or fuel and water is started.

11. A fuel-cell system for a moving body according to claim 1, wherein a supply flow rate or intermittent time of said fuel, water and air, or fuel and air, or fuel and water are corrected based on a temperature or driving history of each of said reforming reactor, said carbon monoxide removing reactor and said combustor when said accelerator is closed.

12. A control method of a fuel-cell system for a moving body comprising supplying fuel, water and gas including oxygen, or fuel and the gas including oxygen to a reforming reactor such that minimum hydrogen required for maintaining a temperature of said reforming reactor is generated when said moving body was running and an accelerator was closed, supplying minimum gas including oxygen required for maintaining a temperature of a carbon monoxide removing reactor to said carbon monoxide removing reactor when said moving body was running and said accelerator was closed, and supplying minimum gas including oxygen required for maintaining a temperature of a combustor to said combustor when said moving body was running and said accelerator was closed.

13. A fuel-cell system for a moving body comprising:

a reforming reactor for reforming fuel to generate gas including hydrogen;

a carbon monoxide removing reactor for removing carbon monoxide included in a reformed gas generated in said reforming reactor;

a fuel-cell for generating electric power using the reformed gas which passed through said carbon monoxide removing reactor and gas including oxygen;

a compressor for supplying the gas including oxygen to said reforming reactor, said carbon monoxide removing reactor and said fuel-cells;

a running state detecting means for detecting a running state of said moving body;

an accelerator opening detecting means for detecting accelerator opening of said moving body;

a control means wherein when said control means judged that said moving body was running and said accelerator was closed based on information of said running state detecting means and said accelerator opening detecting means, said control means supplies fuel, water and gas including oxygen, or fuel and the gas including oxygen to said reforming reactor such that minimum hydrogen required for maintaining a temperature of said reforming reactor is generated, and supplies minimum gas including oxygen required for maintaining a temperature of said carbon monoxide removing reactor to said carbon monoxide removing reactor; and a combustor for reaction processing discharged reformed gas and discharged gas including oxygen discharged from said fuel-cell, and wherein said control means supplies minimum gas including oxygen required for maintaining a temperature of said combustor when it is judged that said moving body was running and said accelerator was closed based on the information of said running state detecting means and said accelerator opening detecting means.

* * * * *